United States Patent
Blanco et al.

(10) Patent No.: US 6,249,530 B1
(45) Date of Patent: *Jun. 19, 2001

(54) NETWORK BANDWIDTH CONTROL

(75) Inventors: Marcos Ares Blanco, Grenoble; Jean-Christophe Martin, Meylan, both of (FR)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,707
(22) Filed: Dec. 22, 1997
(51) Int. Cl.[7] ................................. H04J 3/16; H04J 3/22
(52) U.S. Cl. ................................................ 370/468; 370/231
(58) Field of Search ................................. 370/468, 465, 370/409, 229, 230, 231, 235, 236, 237, 389, 394, 253, 412, 352, 395

(56) References Cited

U.S. PATENT DOCUMENTS

| | | | |
|---|---|---|---|
| 5,063,562 | * 11/1991 | Barzilai et al. | 370/231 |
| 5,163,046 | * 11/1992 | Hahne et al. | 370/237 |
| 5,293,379 | 3/1994 | Carr | 370/94.1 |
| 5,307,347 | 4/1994 | Duault et al. | 370/85.1 |
| 5,307,413 | 4/1994 | Denzer | 380/49 |
| 5,309,437 | 5/1994 | Perlman et al. | 370/85.13 |
| 5,351,237 | 9/1994 | Shinohara et al. | 370/58.3 |
| 5,442,637 | * 8/1995 | Nguyen | 714/708 |
| 5,535,199 | 7/1996 | Amri et al. | 370/60 |
| 5,592,627 | * 1/1997 | Burt et al. | 709/232 |
| 5,764,625 | * 6/1998 | Bournas | 370/231 |
| 5,974,028 | * 10/1999 | Ramakrishnan | 370/229 |
| 5,995,726 | * 11/1999 | Dillon | 395/200.61 |
| 6,023,453 | * 2/2000 | Ruutu et al. | 370/229 |

* cited by examiner

Primary Examiner—Ajit Patel
Assistant Examiner—Brian Nguyen
(74) Attorney, Agent, or Firm—William J. Kubida; Kent A. Lembke; Hogan & Hartson LLP

(57) ABSTRACT

A method and mechanism for controlling network bandwidth by dynamically determining a current window size for a destination buffer. A first window size is determined for the destination buffer at a first time. Then, a current window size is determined a second time as a function of the first window size, a desired bandwidth value, and a bandwidth used between the first time and the second time. A desired bandwidth for a particular connection is achieved by an adaptive or delta-based approach rather than by use of round trip time (RTT) computations. Bandwidth control can be achieved by a software or a hardware bandwidth control mechanism. Possible applications of the bandwidth control is in a server or a quality of service unit.

23 Claims, 5 Drawing Sheets

NETWORK BANDWIDTH CONTROL

BACKGROUND OF THE INVENTION

This invention relates to bandwidth control over a telecommunications network. In particular, the invention relates to bandwidth control for controlling communication flow on a connection to a network station, for example for controlling TCP/IP traffic on an Internet connection.

Conceptually, the Internet provides three sets of services. At the lowest level, a connectionless delivery system provides a foundation on which everything rests. At the next level, a reliable transport service provides a high level platform. At the third level, application services are provided which rely on the reliable transport service.

A fundamental Internet service consists of an unreliable, best-effort, connectionless, packet delivery system. The service is described as being "unreliable" because delivery is not guaranteed. A packet may be lost, duplicated, or delivered out of order, but the Internet will not detect such conditions, nor will it inform the sender or receiver. The service is described as being "connectionless" because each packet is treated independently from all others. A sequence of packets sent from one machine to another may travel over different paths, or some may be lost while others are delivered. The service may be described as "best-effort" because the Internet aims to deliver packets.

The protocol that defines the unreliable, connectionless, delivery mechanism is called the "Internet Protocol", and is usually referred to by its initials IP. IP defines the formal specification of data formats, including a basic unit of data transfer and the exact format of all data passing across the Internet. IP also includes rules which specify how packets should be processed and how errors should be handled. In particular, IP embodies the idea of unreliable delivery and packet routing.

Above the IP layer of the Internet protocol structure one service which is provided is a reliable transport service which is typically called the "reliable stream transport service", defined by the Transmission Control Protocol (TCP). The combination of the TCP protocol and the underlying Internet protocol (IP) is often referred to as TCP/IP.

The reliable stream delivery service provided by the TCP can be contrasted with the unreliable datagram protocol (UDP) which is also provided over the Internet. The UDP provides an unreliable delivery service because delivery is not guaranteed. For example, packets may be lost or destroyed when transmission errors interfere with data, when network hardware fails, or when networks become too heavily loaded to accommodate the load presented.

The TCP on the other hand has a complex structure providing delivery by means of a stream of bits, divided into eight-bit bytes. The TCP specifies the format of the data and acknowledgements that two computers are to exchange to achieve reliable transfer, as well as the procedure to ensure that data arrives correctly.

Further details of aspects of the Internet and TCP/IP protocols may be found, for example, in the following U.S. Pat. Nos. 5,293,379; 5,307,347; 5,307,413; 5,309,437; 5,351,237; and 5,535,199.

As mentioned above, given that the underlying Internet protocol is unreliable, TCP transmissions operate in accordance with a technique known as positive acknowledgement with retransmission. The technique requires a recipient to communicate with the source, sending back an acknowledgement message every time it receives data. The sender keeps a record of each packet that it sends and waits for an acknowledgement before sending the next packet. The sender also starts a timer when it sends its packet and retransmits a packet if the timer expires before the acknowledgement arrives.

The period between the transmission of a message and the receipt of an acknowledgement (say A1) is termed the Round-Trip-Time (RTT). The RTT varies over time depending upon many factors such as, for example, network loading (e.g., delays at intermediate nodes in the system) and loading on the receiver. An important factor in determining the RTT is the available bandwidth. Thus, where multiple clients have access to a common server, for example, in order to balance the quality of service between clients, it is desirable to control the bandwidth allocated to the individual clients.

A bandwidth control mechanism has been proposed which is based on the measurement of the RTT experienced on a given connection and the advertised TCP window size of the receiver which is to be found in the WINDOW field of a TCP header. The RTT can be defined as the time between sending a byte with a particular sequence number and receiving an acknowledgment that covers that sequence number.

With such an arrangement, the maximum amount of bandwidth that has been used by a particular connection since an arbitrary time t(i−1) depends on the value of both parameters according to the expression known as the "Bandwidth-Delay Product":

$$\text{Used Bandwidth since t(i-1) bps=Receiver Window Size since t(i-1)/ RTT(S)} \tag{1}$$

This expression presents a direct way of modifying the bandwidth usage of a particular flow. In other words, if we know the RTT of the flow, we can act on the Window Size value to get the desired bandwidth.

However, the computation described above has limitations. Firstly, there is the problem of determining the value of the RTT with sufficient precision. The computation of the RTT is not an easy task as it requires arrival of packets in both directions between two stations to be taken into account. Also, the RTT is not the same for every packet (e.g., a TCP acknowledgment may acknowledge the reception of various packets). Moreover, an average (non-instantaneous) calculation must be adopted. Further information on the so-called bandwidth delay product can be found in, for example, TCP/IP Illustrated, Volume 1: The Protocols W. Richard Stevens Addison-Wesley, October 1995.

Although TCP is provided over the Internet, it is in fact an independent general purpose protocol which can also be used with other delivery systems. TCP makes very few assumptions regarding the underlying network, and it can also be used over a single network like Ethernet, as well as over a complex Internet, or Intranet. Indeed, although particular implementations of the invention are described in the context of the TCP/IP traffic over the Internet, the invention is not limited thereto.

Accordingly the present invention seeks to provide a solution to bandwidth control without the disadvantages of the approach described above.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with an aspect of the invention, there is provided a computer implemented method of controlling network bandwidth by dynamically determining a current window size for a destination buffer as a bandwidth control parameter for a communication flow. The method comprises:

a) determining a first window size for the destination buffer at a first time; and
b) determining a current window size at a second time as a function of the first window size, a desired bandwidth value and a bandwidth used between the first time and the second time.

Thus, a method according to the invention provides a solution to the problem of achieving a desired bandwidth for a particular connection, without the problems associated with RTT calculations as described in the introduction. An embodiment of the invention enables a "desired bandwidth" limit to be assigned to a specific connection, for example a TCP connection, and for the adaptive determination of a window size for a communication flow without needing to perform absolute RTT calculations. In other words, whereas the approach described in the introduction involves the control of bandwidth in response to calculation of an absolute RTT value, an embodiment of the present invention employs a relative, or differential, approach providing successive recalculation of a current window size value based on a prior widow size value.

In accordance with another aspect of the invention, there is provided a bandwidth control mechanism for a telecommunications network station. The bandwidth control mechanism is configured to be operable to define a current window size for a destination buffer as a bandwidth control parameter for a communication flow. The bandwidth control mechanism is configured to be responsive to a window size determined for the destination buffer at a prior time, a desired bandwidth value and a bandwidth used between the prior time and a current time for determining the current window size.

An embodiment of a bandwidth control mechanism according to the invention takes account of the realisation that bandwidth control can be achieved without the calculation of an absolute RTT value, but rather on the basis of a relative, or differential calculation of current window size based on a prior calculation of window size.

Surprisingly, the relative computational approach of an embodiment of the invention enables more accurate control of bandwidth for a connection than would be possible with an absolute computation of an RTT value. Typically, absolute RTT calculation can only be achieved with low precision. As the RTT error margin is high, the bandwidth error margin is also high. In an embodiment of the invention, the error margin in bandwidth computation can be reduced dramatically by the use of the adaptive (delta) approach (i.e. a relative or differential approach) rather than an approach based on absolute calculation of RTT values.

As an embodiment of the invention provides bandwidth control without any direct computation of RTT values, further advantages result. Firstly, the "error margin" is not cumulative. Also, whereas direct RTT computation requires two-way control (packet sending plus acknowledgment reception), which is time consuming and makes high memory demands, the computations in an embodiment of the invention may be based on a one way control (e.g., the detection of TCP acknowledgments).

In accordance with another aspect of the invention, there is provided a bandwidth control mechanism for controlling network bandwidth by dynamically determining a current window size for a destination buffer as a bandwidth control parameter for a communication flow, the mechanism comprising means for determining a current window size as a function of a first window size at a first time, a desired bandwidth value and a bandwidth used between the first time and a second time.

The bandwidth control mechanism can be provided as a software bandwidth control mechanism on a storage medium.

The bandwidth control mechanism can also be implemented as a quality of service unit for a telecommunications network or network station.

The invention also provides a telecommunications network station comprising a bandwidth controller.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Particular embodiments of the invention will now be described which employ an adaptive TCP window size calculation method in the context of an Internet application. However, it will be appreciated that the invention is not limited thereto, and that the invention finds application to any communications network application where available bandwidth is a function of round trip time factors, and vice versa.

Figure 1:
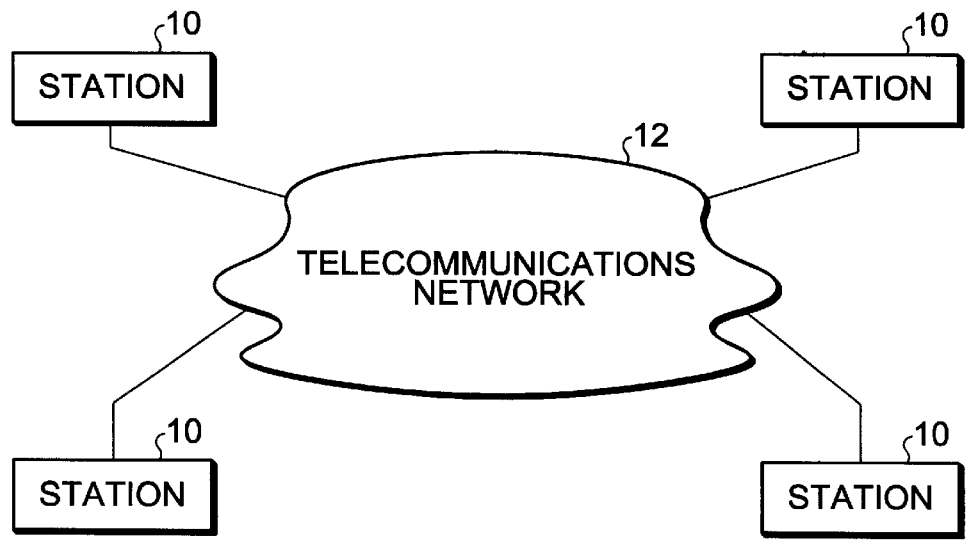
FIG. 1 is a schematic representation of a telecommunications environment including a plurality of stations interconnected via a network.

FIG. 1 of the accompanying drawings is a schematic representation of an instance of a computer network where a number of stations 10 communicate via a network 12. The network could be a local area network (LAN) or wide area network (WAN), and intra- or Inter-network. Each of the stations 10 could be formed by a single computer or by a network of computers, for example a LAN or WAN. Also, although only four stations 10 are shown, it will be appreciated that a typical computer network includes many more stations arranged in a complex interconnection structure. The interconnection structure could be at one logical level, or could employ at least in part a hierarchical structure. The individual stations 10 can make variable demands on the system, both relative to each other and over time. In a typical situation, a relatively smaller number of the stations 10 will form server stations and a relatively larger number of the stations 10 will form client stations. Some may act as both client and server stations in different aspects of their operation.

Figure 2:
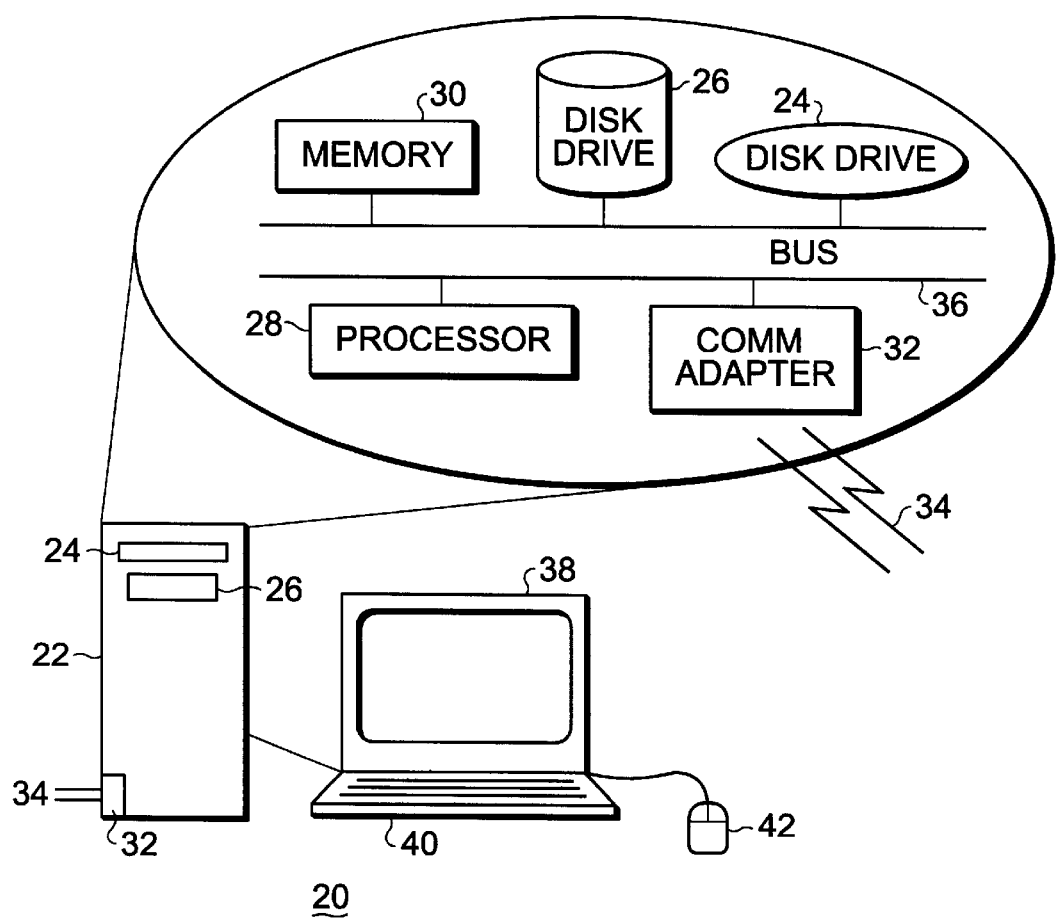
FIG. 2 is a schematic representation of one possible implementation of a station.

FIG. 2 of the accompanying drawings is a schematic representation of a possible configuration for a computer system which could form one of the stations 10. These stations can be implemented using any appropriate technology. However, as illustrated in FIG. 2, the station 10 is implemented by a server computer 20 comprising a system unit 22, optionally with a display 38, keyboard 40 and other input devices 42. It should be noted that the station 10 need not include a keyboard, display, etc. FIG. 2A of the accompanying drawings is a schematic block representation of aspects of the contents of the system unit 22. As illustrated in FIG. 2A, the system unit includes a processor 28, memory 30, disk drives 24 and 26, and a communications adaptor 32 for connection to one or more telecommunications lines 34 for connection to the telecommunications network 12. As illustrated in FIG. 2A, the components of the system unit are connected via a bus arrangement 36. It will be appreciated that FIGS. 2/2A are a general schematic representation of one possible configuration for a server computer for forming a router or sender or destination station, and that many alternative configurations could be provided.

Figure 3:
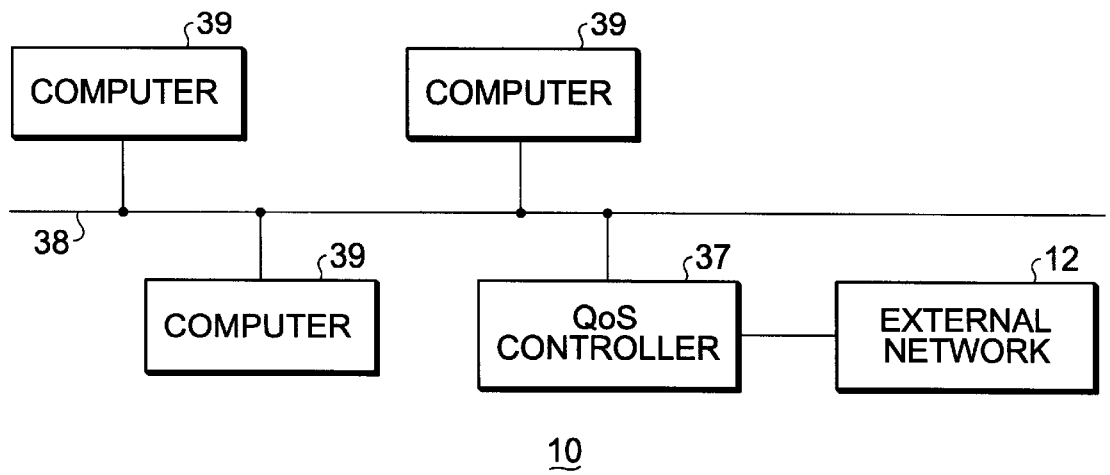
FIG. 3 is a schematic representation of another possible implementation of a station.

FIG. 3 illustrates another example of a possible implementation of one of the stations 10. In this case, the station 10 forms a quality of service (QoS) controller 37 for a local area network 38, to which a plurality of computers 39 are connected. The quality of service controller 37 controls local area network access to and/or from the external network 12 and can also control other access and service functions within the local area network.

Particular embodiments of the invention described hereinafter relate to bandwidth control in a TCP/IP Internet environment, although, as mentioned above, it should be understood that the invention is not limited thereto.

As mentioned above, the basic unit of data transfer over the Internet is termed an "Internet datagram", or alternatively "IP datagram", or simply "datagram". A datagram comprises header and data areas, and source and destination addresses. There is no fixed size for a datagram. Bearing this in mind, and also the physical constraints of the underlying hardware services on which the Internet is based, it is necessary to divide the datagram into portions called "fragments".

Figure 4:
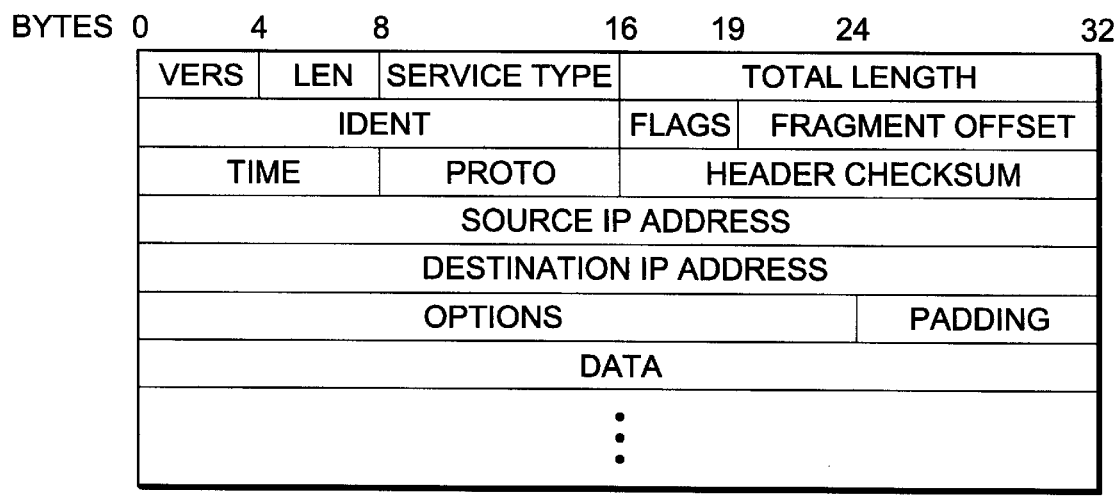
FIG. 4 is a schematic representation of a datagram format for use on the network.

FIG. 4 illustrates the format of an Internet datagram. The same format is used for a fragment of a datagram.

The 4 bit version field (VERS) specifies the IP protocol version and is used to ensure that all of the nodes along the path of the datagram agree on the format.

The LEN field gives the datagram header length measured in 32 bit words. The TOTAL LENGTH field gives the length of the IP datagram measured in octets including the length of the header and data.

The SERVICE TYPE field contains handling details for the datagram.

Three fields in the datagram header, IDENT, FLAGS, and FRAGMENT OFFSET, control fragmentation and reassembly of datagrams. The field IDENT contains a unique identifier that identifies the datagram.

In the FLAGS field, a first bit specifies whether the datagram may be fragmented, and a second bit indicates whether this is the last fragment in the datagram. The FRAGMENT OFFSET field specifies the offset of this fragment in the original datagram, measured in units of 8 octets, starting at offset zero.

As each fragment has the same basic header format as a complete datagram, the combination of the FLAGS and FRAGMENT OFFSET fields are used to indicate that the headers relate to fragments, and to indicate the position of the fragment within the original datagram. The FRAGMENT OFFSET field identifies the position within the datagram, and the second of the FLAGS bits mentioned above (which is sometimes called the MORE FRAGMENTS flag) is used to indicate whether there are any more fragments in the datagram, or conversely that the fragment concerned is the last fragment of the datagram.

The field PROTO is a form of type field. The HEADER CHECK SUM figure ensures integrity of header values.

SOURCE IP ADDRESS and DESTINATION IP ADDRESS contain 32 bit Internet addresses of the datagram's sender and intended recipient. The OPTIONS field and the PADDING field are optional in the datagram. The field labelled DATA represents the beginning of the data field.

Figure 5:
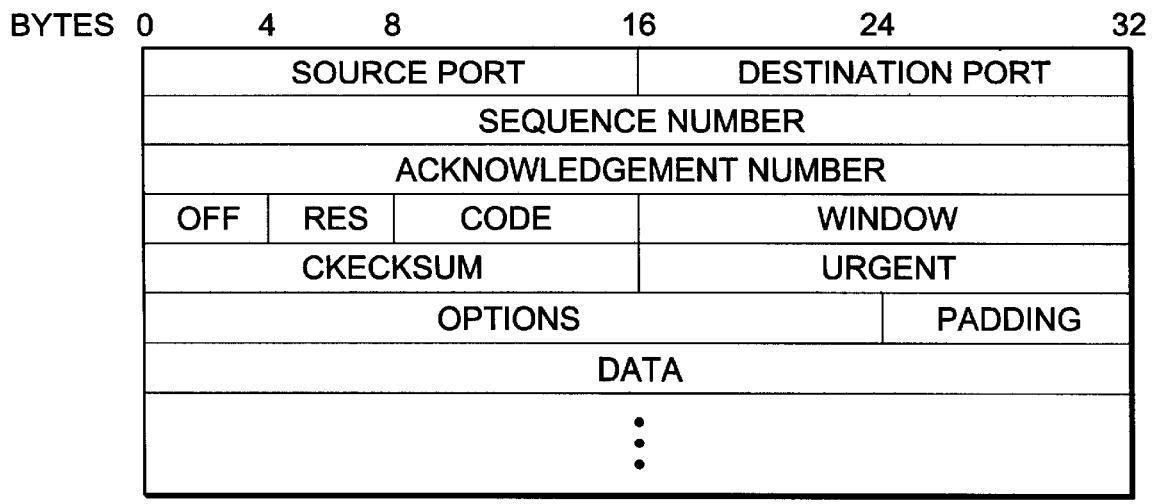
FIG. 5 is a schematic representation of a segment format for use on the network.

FIG. 5 represents the format of a segment used to communicate between two nodes under the TCP. Each segment is divided into two parts, a header followed by data. The header comprises SOURCE PORT and DESTINATION PORT fields containing the TCP PORT numbers that identify the application programs at the end of the connection. The SEQUENCE NO. identifies the position in the sender's byte stream of the data in the segment. The ACKNOWLEDGEMENT NO. field identifies the position of the highest byte that the source has received. The SEQUENCE NO. refers to the stream flowing in the same direction as the segment, while the ACKNOWLEDGEMENT NO. refers to the stream flowing in the opposite direction. The OFF field contains an integer that specifies the offset of the data portion of the segment. This is needed because the OPTIONS field varies in length. The field RES is reserved for future use. Segments can be used to carry an acknowledgement or data or requests to establish or close a connection. The CODE field is used to determine the purpose and content of the segment. The WINDOW field specifies the buffer size that the destination is willing to accept every time it sends a segment. The CHECK SUM field includes a TCP header check sum. The URGENT POINTER field is used for identifying urgent data.

The OPTIONS field is used to communicate information with the destination. For example, the OPTIONS field can be used to specify a maximum segment size. The DATA indication represents the start of the data field of the segment.

As the TCP sends data and variable length segments, acknowledgements necessarily refer to a position in the stream, and not to packets or segments. Each acknowledgement specifies one greater than the highest byte position that has been received. Accordingly, acknowledgements specify the number of the next byte that the receiver expects to receive.

Figure 6:
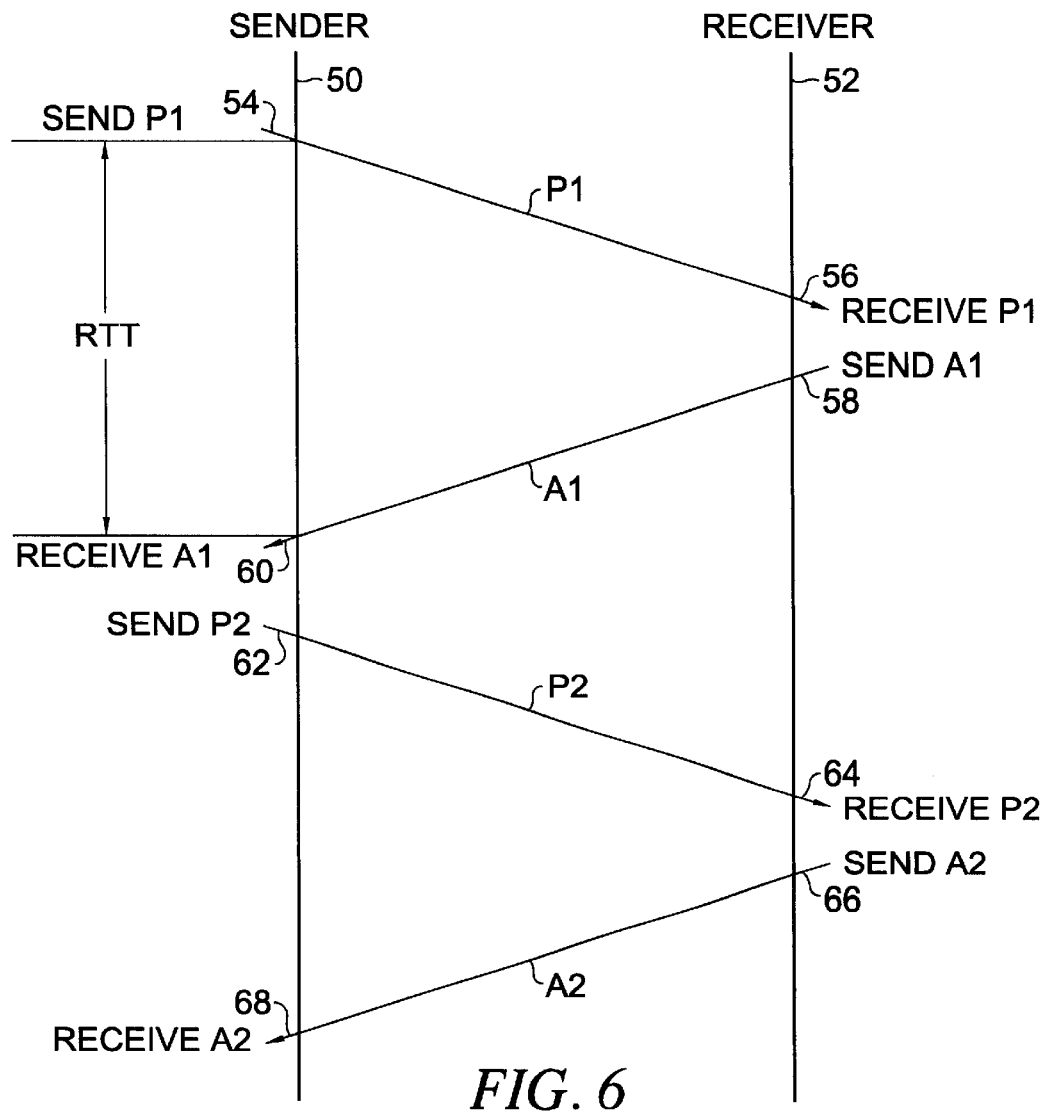
FIG. 6 illustrates the transmission of packets and acknowledgements over the network.

FIG. 6 is a schematic representation of the transmission and reception of packets and acknowledgements. The left hand side of FIG. 6 represents events at a sender side 50, the right hand side represents events at a receiver side 52 and the middle portion represents network messages passing between the sender and the receiver.

At 54, the sender 50 (eg, a client station 10) sends a packet P1 to a receiver 52 (eg, a server station 10) via the network and starts a timer for message P1. When the receiver 52 receives, 56, the packet P1; the receiver then sends, 58, an acknowledgement A1. When the acknowledgement A1 is received, 60, at the sender 50, the sender can cancel the timer and send 62, the next packet P2 to the receiver 52 setting a timer for the message P2. When the receiver 52 receives, 64, the packet P2, it sends 66, a second acknowledgment A2, to the sender 50. Once again the sender can cancel the timer. The process then continues with the transmission of further packets on receipt of the second acknowledgement A2.

Figure 7:
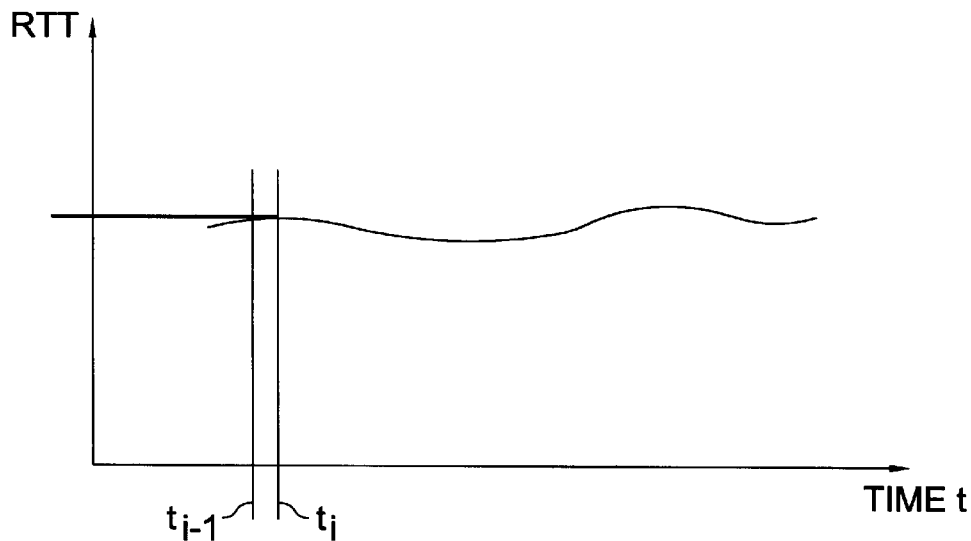
FIG. 7 illustrates the variation of a round trip time over time.

FIG. 7 illustrates a variation in Round-Trip-Time over time. As the value of the RTT changes only very gradually over time t, the RTT values at two close timings t(i–1) and t(i) are substantially the same.

Thus, if the "Used bandwidth" of flow over a connection in two samples, close enough to each other, say at times t(i–1) and t(i), is considered, then the following assumption can be made:

$$RTT(t(i-1))=RTT(t(i)) \qquad (2)$$

This assumption is quite reasonable, because the RTT does not vary significantly under normal circumstances as represented in FIG. 7. If this assumption is made, then one can compute the "window size since t(i)" needed in order to get a "desired bandwidth since t(i)" according to the value of the old "window size since t(i–1)" and the "actual used bandwidth since t(i–1)". Thus:

$$WSt(i)=WSt(i-1) * DUBt(i)/AUBt(i-1), \qquad (3)$$

where:

WSt(i)=Window Size since t(i)
WSt(i–1)=Window Size since t(i–1)
DUBt(i)=Desired Used Bandwidth since t(i))
AUBt(i–1)=Actual Used Bandwidth since t(i–1)

These computations can all be made without knowing the real value of RTT. It is to be noted that this takes account of the fact that RTT typically evolves gradually between two "close enough" samples at time t(i–1) and t(i) and is not based on an absolute value of RTT at t(i–1) and t(i). The technique employed by an embodiment of the invention thus provides the solution of a one-variable function (the RTT as a function of time) whose absolute values are not precisely known, by using its derivative. This is possible because the derivative of the function is very small and approximates to zero.

Apart from the error margin improvement, another advantage resides in the fact that all computations needed can be done in one traffic flow direction: in the particularly described embodiment the acknowledgment direction.

Figure 8:
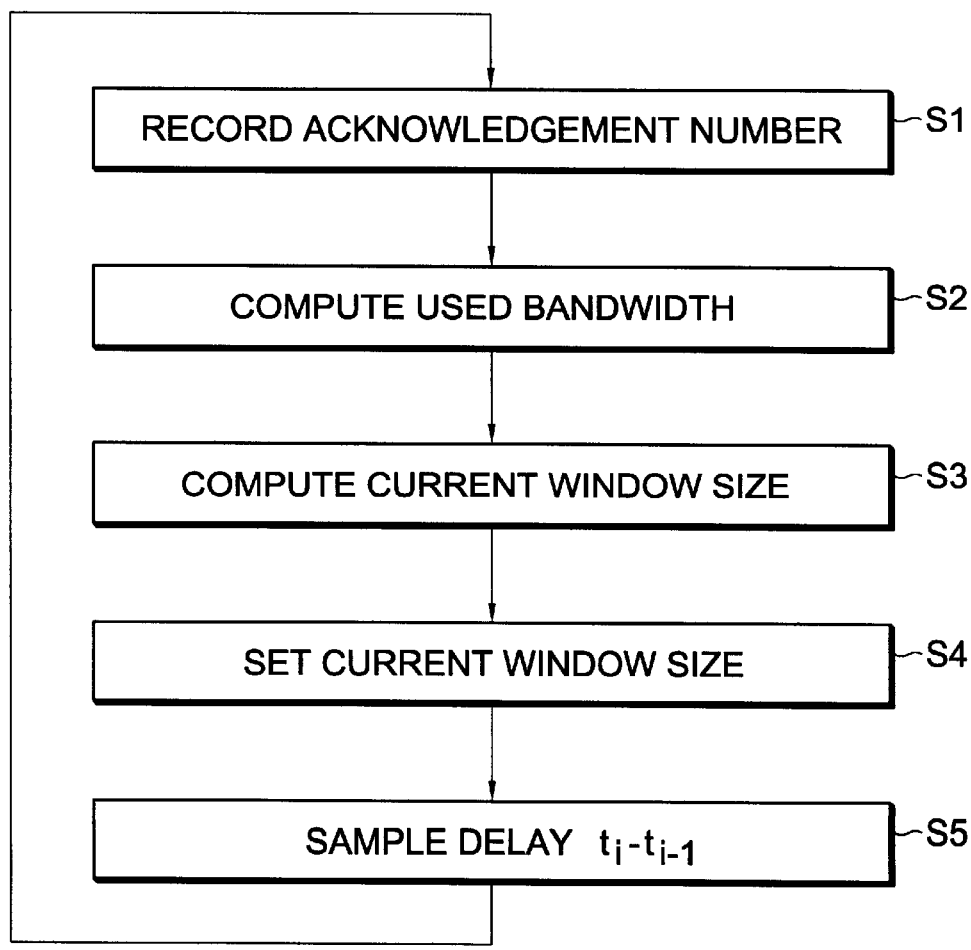
FIG. 8 is a flow diagram representing the operation of one embodiment of the invention.

FIG. 8 is a schematic flow diagram of the operation of the bandwidth control mechanism for real time computation in an adaptive manner of the window size for a desired bandwidth for every flow for which bandwidth is to be controlled.

In step S1, at each sample time t(i) a record is made of the mostly recently received transmission unit identifier (e.g., an acknowledgement number). This record is kept at least until the subsequent sample time (t+1).

In step S2, the Used Bandwidth since t(i–1) is computed from the difference between both the transmission unit identifier for the current time t(i) and a record of that identifier for the previous sample time t(i–1). Where the transmission unit identifiers are, for example, acknowledgement numbers allocated in sequence for successive acknowledgements, the difference t(i) minus t(i–1) directly gives a number of a result representative of a number of bytes that have been acknowledged between both times. Under TCP/IP, the difference actually gives the number of bytes directly, as under this protocol the difference between two successive acknowledgement numbers is the number of bytes transmitted therebetween.

The computation of the used bandwidth between t(i–1) and t(i) can be effected as:

$$AUBt(i-1)=(ANt(i)-ANt(i-1))/(t(i)-t(i-1)), \qquad (4)$$

where:

AUBt(i–1)=Actual Used Bandwidth since t(i–1)
ANt(i)=Acknowledgement Number at time t(i)
ANt(i–1)=Acknowledgement Number at time t(i–1)
t(i) time t(i)
t(i–1)=time t(i–1)

In step S3, the "Window Size at t(i)" (WSt(i)) computation (equation 3) can be performed as:

$$WSt(i)=WSt(i-1) * DUBt(i)/AUBt(i-1), \qquad (3)$$

The "Desired Used Bandwidth at t(i)" (DUBt(i)) and "Window Size at t(i–1)" (WSt(i–1)), are known values. In particular, the Desired Used Bandwidth at t(i) is the bandwidth for the flow concerned which it is desired to achieve and Window Size at t(i–1) is known from the previous pass through step S3.

In step S4, the Window Size at t(i) value can be set in the WINDOW SIZE field of an outgoing message or messages (see for example FIG. 4). The Window Size value is then used in a conventional manner to indicate the amount of information which the recipient is able to receive at its input buffer at the current time. This value will change with time depending on dynamic factors associated with the connection which will determine the actually bandwidth until a subsequent time at which the window size is recalculated as described above.

After a new sample delay (step S5) control passes back to step S1.

Thus it can be seen that the method as represented in FIG. 8 enables control of network bandwidth for a connection by dynamically determining a current window size for a destination buffer as a bandwidth control parameter for a communication flow. The method includes steps of determining a first window size for the destination buffer at a first time on a first pass of the method steps S1–S5. Then on a second pass of steps S1–S5 at a second time, the method includes determining a current window size at the second time as a function of the first window size, a desired bandwidth value and a bandwidth used between the first time and the second time. The steps illustrated in FIG. 8 are repeated at successive timings to provide adaptive bandwidth control.

The used bandwidth is determined from a first transmission unit in a first direction at the first time and a second transmission unit in the same direction at the second time, where the transmission unit can be a network message packet, or a network acknowledgement packet. The used bandwidth is determined from a difference between transmission unit numbers at the first and second times.

In the particularly described embodiment the transmission unit number is a TCP packet sequence number.

The first and second times can be determined in response to a clock, or alternatively, in response to the detecting the reception of respective network messages in a given direction over a connection, or to respective acknowledgements, or indeed to any other stimulus as appropriate.

The method can be implemented by software operating on a computer or in a quality of service unit at or as a station 10. The software can be stored as a sequence of instructions in a memory of the computer (e.g. a memory of a station as shown in FIG. 2) or on a transportable data carrier for use with such a computer. It could also be implemented, at least in part, by appropriate hardware logic, for example in the form of one or more Application Specific Integrated Circuits (ASICs).

Figure 9:
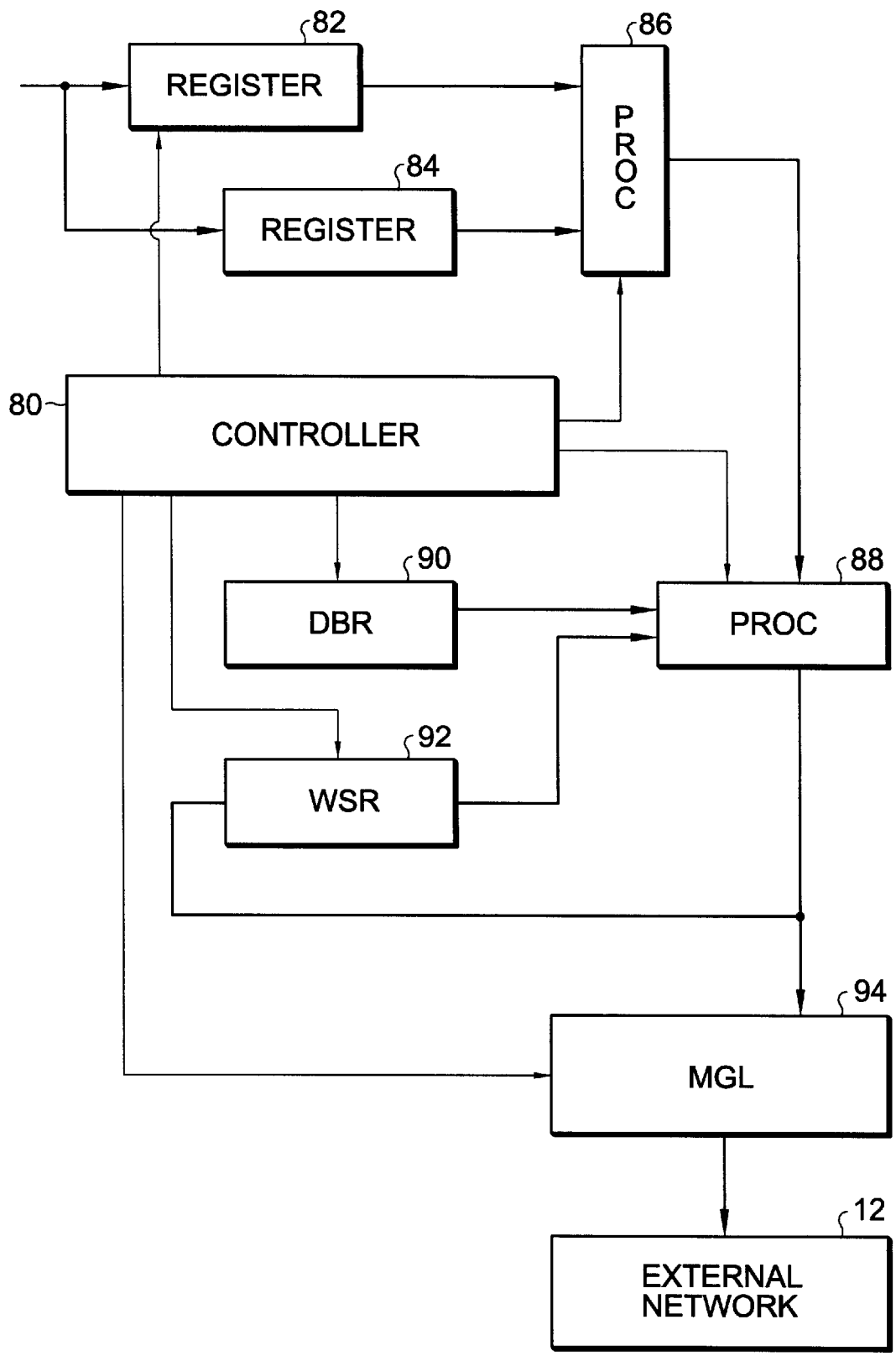
FIG. 9 is a schematic block diagram of a bandwidth control mechanism according to an embodiment of the invention.

FIG. 9 is a schematic representation of the functional components of an example of a bandwidth control mechanism according to an embodiment of the invention. This mechanism can also be implemented by software for controlling the operation of programmable computer hardware, or at least in part by special purpose hardware.

As shown in FIG. 9, a controller 80 of the bandwidth controller causes a first transmission unit number (e.g. an acknowledgement number—see FIG. 5) to be extracted from a transmission unit (e.g. a TCP segment) and stored in a first register 82 along with record of the time of first the transmission unit (if required) and/or the recording of the first transmission unit number.

The controller 80 also causes second transmission unit number (e.g. an acknowledgement number—see FIG. 5) to be extracted from a subsequent transmission unit (e.g. a TCP segment) and stored in a second register 84 along with record of the time of the second transmission unit (if required) and/or the recording of the second transmission unit number.

The controller 80 then causes a processor 86 to determine a used bandwidth value by computing the amount of data transmitted between the first and second times (e.g., for successive TCP segments, the number of bytes transmitted by subtracting the first acknowledgement number from the second acknowledgement number). If the computation is performed at regular intervals, it is not necessary to record the times of the transmission units or the recording of the transmission unit numbers. However, if the computation is not performed at regular intervals, the times could be used to determine a bandwidth used per unit time.

The controller then causes a processor 88 to determine a current window size in accordance with equation (4) above on the basis of the used bandwidth value output from the processor 86, the desired bandwidth value from a desired bandwidth register (DBR) 90 and a prior window size value from a window size register (WSR) 92 determined at the timing of the first time. The resulting current window size value can be output from the processor 88 to message generation logic (MGL) 94. The computed current window size then replaces the value in the window size register 92. The message generation logic 94 can be conventional and uses the computed current window size value for the WINDOW field of a TCP segment.

The desired bandwidth value in the register 90 can be predetermined for a particular connection, or can be computed dynamically by any appropriate technique for controlling the distribution of bandwidth between different connections. The initial window size can be chosen substantially at random. As the method is an adaptive one, the window size will rapidly approach the optimum after a low number of iterations.

Preferably the controller causes the registers 82 and 84 to be operated in a tandem manner, so that the registers alternatively contain the current and previously recorded values.

Although separate processors 86 and 88 are shown in FIG. 9 for ease of explanation, these can be implemented as a single processor or processing logic.

In a preferred embodiment, the bandwidth control mechanism can form part of a server and can be responsive to receipt of messages at the server to extract acknowledgement numbers from received messages. The server can then control the bandwidth available over one or more connections.

Although, for reasons of explanation, a bandwidth control mechanism for a single connection has been described, bandwidth control can be effected in the same manner for a plurality of different connections, for example between a server and a plurality of clients. Algorithms can be employed to determine the distribution of desired bandwidth between the different connections in accordance with any suitable parameters such as bandwidth priorities, bandwidth paid for, and so on.

It will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

What is claimed is:

1. A computer implemented method of controlling network bandwidth by dynamically determining a current window size for a destination buffer as a bandwidth control parameter for a communication flow; said method comprising:
  a) determining a first window size for said destination buffer at a first time;
  b) determining a current window size at a second time as a function of said first window size, a desired bandwidth value and a bandwidth used between said first time and said second time;
  wherein step (b) comprises determining said used bandwidth from a first transmission unit in a first direction at said first time and a second transmission unit in a same said direction at said second time, whereby said current window size is determined in step (b) without use of round trip time values.

2. The method of claim 1, wherein said transmission unit is a network message packet.

3. The method of claim 1, wherein said transmission unit is a network acknowledgement packet.

4. The method of claim 1, wherein step (b) comprises:
  determining said used bandwidth from a difference between transmission unit identifiers at said first and second times.

5. The method of claim 4, wherein said transmission unit identifier is a Transmission Control Protocol (TCP) packet sequence number.

6. The method of claim 1, wherein said first time is determined as a timing of a first transmission unit in a first direction and said second time is determined as a timing of a second transmission unit in a same said direction.

7. A method of controlling network bandwidth by dynamically determining a current window size for a destination buffer as a bandwidth control parameter for a communication flow; said method comprising:
  a) determining a first window size for said destination buffer at a first time;
  b) determining a current window size at a second time as a function of said first window size, a desired bandwidth value and a bandwidth used between said first time and said second time;

wherein said current window size is computed as a delta function of the form:

$$WSt(i)=WSt(i-1) * DUBt(i)/AUBt(i-1),$$

where:
WSt(i)=Window Size since t(i)
WSt(i−1)=Window Size since t(i−1)
DUBt(i)=Desired Used Bandwidth since t(i)
AUBt(i−1)=Actual Used Bandwidth since t(i−1)
t(i)=time t(i)
t(i−1)=time t(i−1).

8. The method of claim 7, wherein step (b) comprises determining said used bandwidth from a first transmission unit in a first direction at said first time and a second transmission unit in a same said direction at said second time.

9. The method of claim 8, wherein said transmission unit is a network message packet.

10. The method of claim 8, wherein said transmission unit is a network acknowledgement packet.

11. The method of claim 7, wherein said step (b) comprises determining said used bandwidth from a difference between transmission unit identifiers at said first and second times.

12. The method of claim 11, wherein said transmission unit identifier is a Transmission Control Protocol sequence number.

13. A bandwidth control mechanism for a telecommunication network station, said bandwidth control mechanism being configured to be operable to define a current window size for a destination buffer as a bandwidth control parameter for a communication flow, wherein said bandwidth control mechanism is configured to be responsive to a window size determined for said destination buffer at a prior time, a desired bandwidth value and a bandwidth used between said prior time and a current time to determine said current window size wherein, the bandwidth control mechanism comprises prior window size storage, prior transmission unit identifier storage, and a processing logic configured to be responsive to a prior transmission unit identifier in said prior transmission unit identifier storage and to a current transmission unit identifier to determine a used bandwidth value and to be responsive to said used bandwidth value, a prior window size in said prior window size storage and a desired bandwidth for a communications flow to determine a current window size for said communications flow.

14. The bandwidth control mechanism of claim 13, wherein said bandwidth control mechanism is configured to be operable to determine said used bandwidth from a first transmission unit in a first direction at said prior time and a second transmission unit in a same said direction at said current time.

15. The bandwidth control mechanism of claim 14, wherein said transmission unit is a network message packet.

16. The bandwidth control mechanism of claim 14, wherein said transmission unit is a network acknowledgement packet.

17. The bandwidth control mechanism of claim 13, wherein said bandwidth control mechanism is configured to be operable to determine said used bandwidth from a difference between transmission unit identifiers at said current and prior times.

18. The bandwidth control mechanism of claim 17, wherein said transmission unit identifier is a Transmission Control Protocol (TCP) packet sequence number.

19. The bandwidth control mechanism of claim 13, wherein said bandwidth control mechanism is configured to be operable to determine said prior time as a timing of a first transmission unit in a first direction and said current time is determined as a timing of a second transmission unit in the same direction.

20. A bandwidth control mechanism for controlling network bandwidth by dynamically determining a current window size for a destination buffer as a bandwidth control parameter for a communication flow, said mechanism comprising means for determining a current window size as a function of a first window size at a first time, a desired bandwidth value and a bandwidth used between said first time and a second time;

wherein said determining means comprising means for determining said used bandwidth from a first transmission unit in a first direction at said first time and a second transmission unit in a same said direction at said second time, whereby said current window size is determined without use of round trip time values.

21. A software bandwidth control mechanism on a storage medium, said bandwidth control mechanism being configured to be operable within a telecommunications network station to define a current window size for a destination buffer as a bandwidth parameter for a communication flow, wherein said bandwidth control mechanism is configured to be responsive to a window size for said destination buffer at a prior time, a desired bandwidth value and a bandwidth used between said prior time and a current time to determine said current window size wherein said current window size is determined as a delta function of the form:

$$WSt(i)=WSt(i-1) * DUBt(i)/AUBt(i-1),$$

where:
WSt(i)=Window Size since t(i)
WSt(i−1)=Window Size since t(i−1)
DUBt(i)=Desired Used Bandwidth since t(i)
AUBt(i−1)=Actual Used Bandwidth since t(i−1)
t(i)=time t(i)
t(i−1)=time t(i−1).

22. A quality of service unit for a telecommunications network station, said quality of service unit being configured to be operable to define a current window size for a destination buffer as a bandwidth control parameter for a communication flow, wherein said bandwidth control mechanism is configured to be responsive to a window size determined for said destination buffer at a prior time, a desired bandwidth value and a bandwidth used between said prior time and a current time to determine said current window size;

wherein said bandwidth control mechanism is configured to determine said used bandwidth from a first transmission unit in a first direction at said prior time and a second transmission unit in a same said direction at said current time, whereby said current window size is determined without use of round trip time values.

23. A telecommunications network station comprising a bandwidth controller operable to define a current window size for a destination buffer as a bandwidth control parameter for a communication flow, wherein said bandwidth controller is configured to be responsive to a window size determined for said destination buffer at a prior time, a desired bandwidth value and a bandwidth used between said prior time and a current time to determine said current window size as a delta function of the form:

$$WSt(i)=WSt(i-1) * DUBt(i)/AUBt(i-1),$$

where:
WSt(i)=Window Size since t(i)
WSt(i−1)=Window Size since t(i−1)
DUBt(i)=Desired Used Bandwidth since t(i)
AUBt(i−1)=Actual Used Bandwidth since t(i−1)
t(i)=time t(i)
t(i−1)=time t(i−1).

* * * * *